United States Patent [19]
DiCarlo

[11] Patent Number: 5,483,785
[45] Date of Patent: Jan. 16, 1996

[54] APPARATUS FOR WRAPPING BALES OF SILAGE

[75] Inventor: Joseph A. DiCarlo, Prospect, Conn.

[73] Assignee: DiCarlo Machine Corporation, Prospect, Conn.

[21] Appl. No.: 261,399

[22] Filed: Jun. 17, 1994

[51] Int. Cl.⁶ .................. B65B 53/00; B65B 11/56
[52] U.S. Cl. .................. 53/556; 53/587; 53/211; 53/215
[58] Field of Search .................. 53/556, 587, 211, 53/215

[56] References Cited

U.S. PATENT DOCUMENTS

| 4,590,737 | 5/1986 | Rosenthal et al. | 53/587 |
| 4,815,369 | 3/1989 | Akins | 53/587 |
| 4,821,486 | 4/1989 | Oiestad | 53/211 |
| 5,105,607 | 4/1992 | Gratton | 53/587 |
| 5,224,323 | 7/1993 | Fykse | 53/211 |

FOREIGN PATENT DOCUMENTS 2159489  12/1985  United Kingdom .................. 53/211

Primary Examiner—John Sipos
Assistant Examiner—Rodney A. Butler
Attorney, Agent, or Firm—McCormick, Paulding & Huber

[57] ABSTRACT

Apparatus for wrapping bales of hay includes a table with bale rollers disposed outboard of a centrally of a vertical axis extending through the table and about which the table rotates to receive a film of wrap to enclose the hay bale as the table rotates. Endless belts encircle the outboard bale rollers and cause the hay bale to rotate about its transverse axis as the table rotates about its vertical axis. The endless belts are replaceable by sliding laterally from the table without requiring disassembly of the table.

10 Claims, 3 Drawing Sheets

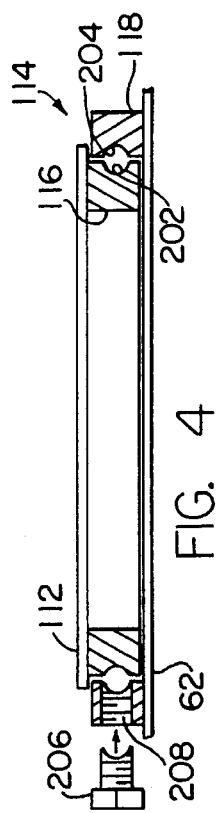
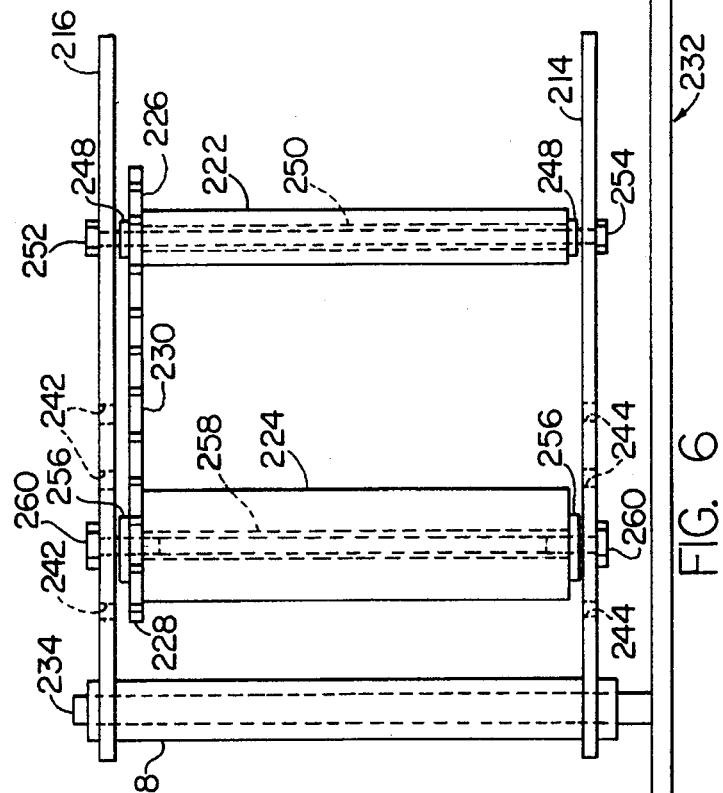
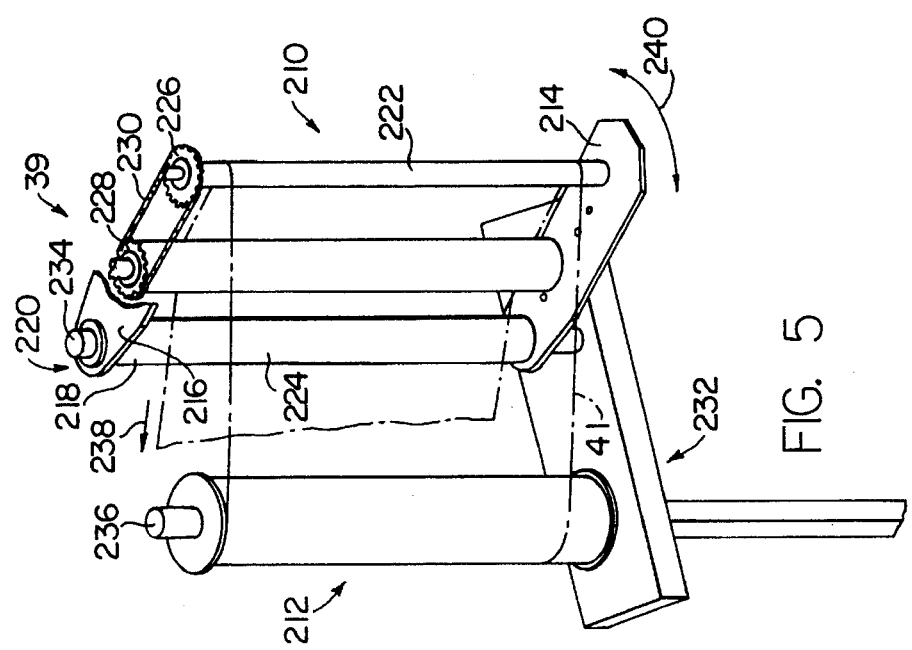

5,483,785

APPARATUS FOR WRAPPING BALES OF SILAGE

BACKGROUND OF THE INVENTION

The present invention relates generally to apparatus for wrapping bales of silage or hay with a plastic film wrapping material around the round bale of cut grass or straw in a substantially air-tight manner so as to enable the wrapped bale to be stored for future use of the contents of the wrapped bale when required.

The usage of bale wrapper apparatus to wrap round bales of straw to shield the straw from exposure to the weather so that dry straw material can be fed to animals, or used as bedding when required, is generally well known and the usage of such bale wrapper apparatus is growing in popularity. Typically, a hay bale to be wrapped is supported on a table which rotates in a horizontal plane to rotate the bale about a vertical axis and includes transverse rollers with the rotating table causing the hay bale to rotate about its horizontal axis as the table rotates so that the film wrapping material eventually encases the entire hay bale. One problem with such hay bale wrapping apparatus is that hay bales tend to ride-off the transverse rollers or if the hay bale is smaller than the separation dimension of the transverse rollers, the hay bale tends to fall in between and not rotate. The solution is to move the transverse rollers closer together or to add endless belts about the transverse rollers to provide a supporting bed for the hay bale. One problem associated with the use of endless belts in known apparatus for wrapping bales of hay is that the rotating table needs to be completely disassembled and the rollers removed from their supporting frame in order to remove and replace the belts as they become worn or broken. The process of removing and replacing endless belts is time consuming and costly in that a mechanic or other skilled worker is generally engaged to replace the endless belts. A further disadvantage is that the hay bale wrapper apparatus is taken out of service for an appreciable period of time.

It is an object of the present invention therefore to provide an improved hay bale wrapper apparatus that facilitates the changing and replacement of endless belts without disassembly of the table so that such endless belt replacement can be accomplished in the field if necessary without removing the hay bale wrapper apparatus from service for any appreciable period of time.

SUMMARY OF THE INVENTION

In accordance with the present invention, a hay bale wrapping apparatus capable of being attached to the rear of a propelling vehicle has a table for rotating the hay bale about its vertical and transverse axis so it can be wrapped by a plastic film drawn from a dispenser and pre-stretch assembly. A substantially rectangularly shaped supporting table is supported for rotation about a vertical axis and tiltable rearwardly about a horizontal axis wherein the table has first and second roller support side frame members and transverse support members extending between and connected to the roller support frame members intermediate the ends of the roller support members to hold the first and second support frame members in a parallel, spaced relationship with respect to one another. Means are provided to couple the transverse support members to support the table for rotation about the central vertical axis and first and second longitudinally extending bale rollers are located outboard of the transverse support members and disposed opposite and parallel to one another at respective opposite ends of the roller support frame members. The respective ends of each bale roller is journaled in the ends of the roller support frame members for rotation about the longitudinal axis of the roller. At least two endless belts are carried by the bale rollers for forming a supporting surface to rotate the hay bale about its horizontal axis wherein the endless belts supported at one side of the table supporting means are removable by sliding the endless belt laterally outward of the bale rollers and the roller support frame members on the same side as the endless belt is supported whereby the belt is removable without disassembly of the table.

BRIEF DESCRIPTION OF THE DRAWINGS

Other features and advantages of the present invention will become readily apparent from the following written description and drawings wherein:

FIG. 4 is a cross-sectional view of the table supporting and rotating thrust bearing taken across the lines 4—4 in FIG. 3.

FIG. 5 is a perspective somewhat schematic view of the plastic film wrap dispenser and pre-stretch assembly;

FIG. 6 is a cross-sectional view of the pre-stretch assembly of FIG. 5.

DESCRIPTION OF PREFERRED EMBODIMENTS

Figure 3:
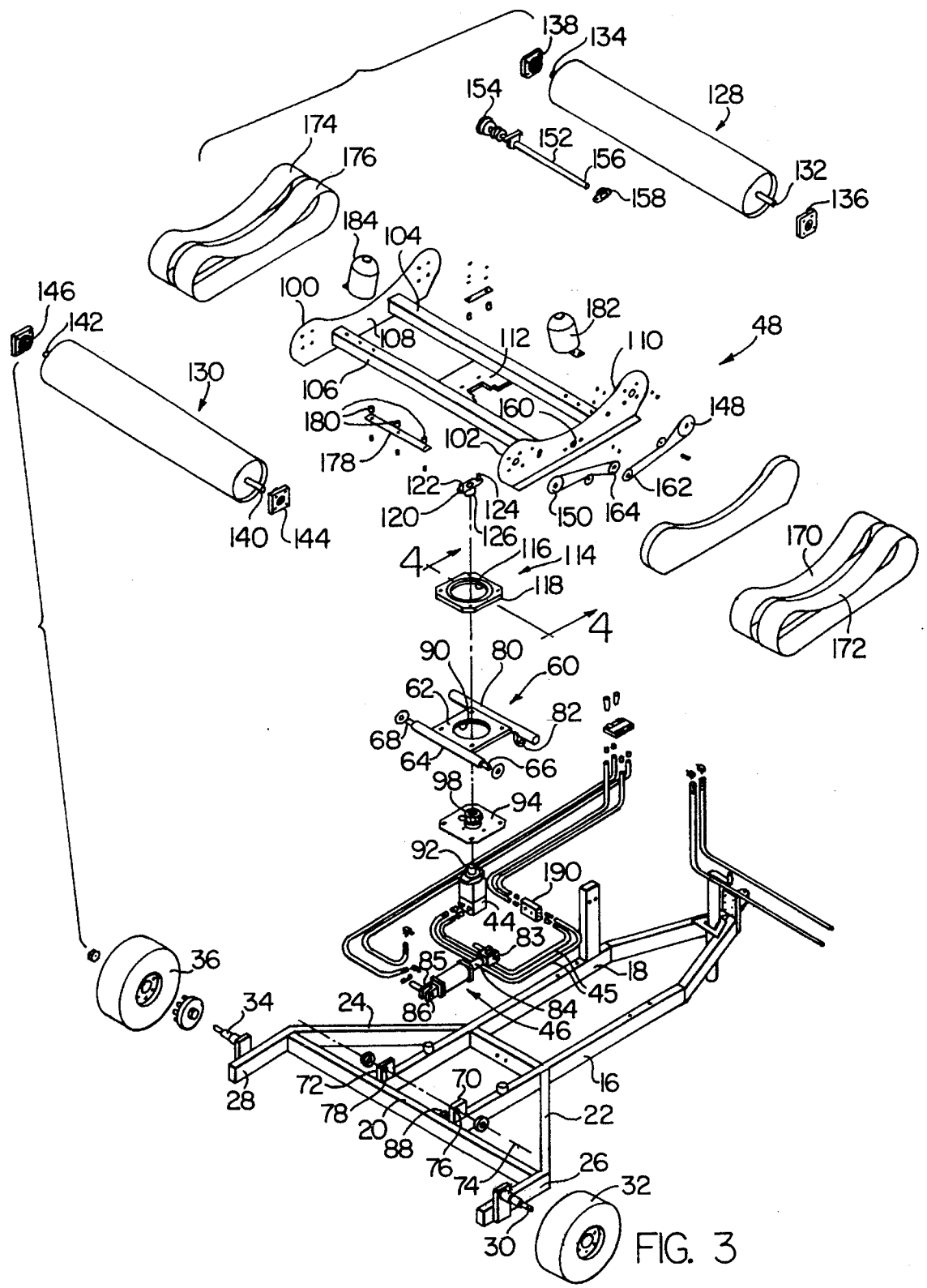
FIG. 3 illustrates in an exploded view the hay bale wrapper apparatus of FIGS. 1 and 2.

Turning now to the drawing FIGURE and considering the invention in further detail, the hay silage or bale wrapper apparatus embodying the present invention is illustrated therein and generally designated 10. The hay bale wrapper apparatus 10 comprises a three point chassis or frame 12 which has a hitch portion 14 adapted to be connected or coupled to a power vehicle to be towed behind the power vehicle. The frame 12 extends rearwardly with two chassis side frame members 16,18 substantially parallel to one another terminating in a transverse frame member 20 as illustrated in FIG. 3. The transverse frame member 20 has respective end portions extending beyond and to either side of the respective side frame members 16,18. Brace members 22,24 extend rearwardly and outwardly respectively from the side frame members 16,18 and respectively terminate at the junction of the ends of the transverse frame member 20 and the axle holding members 26,28, respectively. The members 16 through 28 are substantially coplanar in a common plane which is parallel to the ground surface when the apparatus 10 is in use. The axle support member 26 includes an outwardly extending axle spindle 30 to receive a hub of a wheel 32. Likewise, the axle supporting member 28 carries a spindle 34 which is received in the hub of a wheel 36.

The apparatus 10 further includes a gasoline powered engine shown generally as 38 which operates a hydraulic pump 40. The pump 40 is coupled to a manually operated control designated generally 42 which is used to direct the pressurized hydraulic fluid to be routed to a hydraulic motor generally designated 44 and to the table lifting hydraulic piston assembly generally designated 46 both of which are explained in further detail herein below.

The apparatus 10 further includes a silage or hay bale supporting table generally designated 48 which rotates axially in the horizontal plane about its vertical axis 50. A hay bale shown in phantom as 52 rotates about its vertical axis which tends to be coincident with the vertical axis 50 and about its transverse or horizontal axis 51 as the bale rotates on the surface of endless belts which are driven as the table rotates and as explained below. A plastic film wrapping material shown in phantom as 41 is pulled by the rotating hay bale from a pivotal plastic film wrap dispenser and pre-stretch assembly generally designated 39 and explained in further detail in connection with the discussion of FIGS. 5 and 6. The table 48 rotates clockwise or counterclockwise as shown by the direction arrow 49. The direction of rotation is controlled by the direction of fluid flow through the hydraulic motor 44 via the hydraulic fluid conduit collectively designated 45. The table 48 is also arranged to tilt upwardly in the direction of arrow 54 to discharge the wrapped hay bale 52 rearwardly off the table in the direction of arrow 56.

A pivot bracket generally designated 60 includes a pivot rod 64 attached or welded to a center plate 62 and has ends 66,68 extending beyond and to either side of the center plate 62. The ends 66,68 of the pivot rod 64 are received within journaled openings 76,78 of pivot and holding brackets 70,72 respectively from side frame members 16,18 at the points of intersection with the transverse frame member 20. The pivot bracket 60 pivots about the pivot axis 74 which extend substantially parallel with the transverse frame member 20 and through the journal openings 76,78 of the pivot members 70,72 respectively. The center plate 62 at the side opposite the pivot rod 64 includes a substantially parallel strengthening rod member 80 and provides a coupling and lifting downwardly extending fixed member 82 which is received within a yoke 83 attached to the ram end 84 of the hydraulic cylinder 46. When the hydraulic cylinder 46 is activated, the ram 84 extends to push the free end of the pivot bracket 60 such that the free end follows an arcuate path causing the table 48 which is supported by the pivot bracket and as explained in further detail below, to be tilted upwardly. The end 86 of the hydraulic: cylinder 46 has a yoke 85 which is pivotally connected to the transverse frame member 20 by means of a pivot member 88 received in the yoke.

The center plate 62 of the pivot bracket 60 further includes an opening 90 through which the shaft 92 of the hydraulic motor 44 extends upwardly. The hydraulic motor 44 is connected to a bevel gear drive plate 94 which is also attached to the pivot bracket 60. A bevel gear 98 is also attached to the bevel gear drive plate 94 for movement therewith and the gear is also concentric with the central opening 90 in the center plate 62 of the pivot bracket 60 and extends upwardly beyond the opening as will be apparent below.

The table 48 is illustrated in FIG. 3 in an exploded somewhat schematic view wherein the table includes oppositely disposed roller support frame members 100,102 which are held in a spaced apart upright parallel relationship by transverse support members 104,106 The transverse support members 104,106 extend between the inner face surfaces 108,110 respectively of the roller support frame members 100,102 wherein the transverse support members 104,106 are intermediate the ends of the roller support frame members and are in a spaced parallel relationship with one another. A further supporting plate 112 is intermediate the roller support frame members 100,102 and connect the transverse support members 104,106 substantially midway between the roller support frame members and is substantially in axial alignment with the vertical axis 50 when the table is assembled as part of the hay bale wrapper apparatus.

A table support and thrust bearing generally designated 114 and explained further below comprises an inner bearing race 116 which is fixedly attached to the support plate 112 and rotates within and relative to an outer bearing race 118 which is fixedly attached to the center plate 62 of the hydraulic motor pivot bracket 60. A drive flange 120 is coaxial with the vertical axis 50 and is fixedly attached to the support plate 112 to directly engage and drive by way of interlocking ears 122,124 which extend through openings in the support plate in registry with the ears when the drive flange is connected to the support plate 112. The shaft 92 of the hydraulic motor is received within the end fitting or axial bore 126 of the drive flange 120 to impart rotational force to the drive flange to rotate the table 48. The shaft of the hydraulic motor can be keyed or spleined or otherwise coupled to the drive flange 120 in a manner well known to those skilled in the art. It should be noted the shaft 92 extends through the center opening of the gear 98.

The table 48 further includes longitudinally extending bale rollers generally designated 128,130 respectively and which are disposed parallel to one another and outboard of the transverse support members 104,106. The ends 132,134 of the bale roller 128 are journaled in bearings 136,138 respectively and which bearings are in turn attached to the inner face surfaces of the roller support frame members 100,102 in the end region so that the longitudinal axis of the bale roller is parallel to the transverse support members 104,106. The longitudinal axis of the bale roller 128 is elevated above a plane passing through the transverse support members 104,106. Likewise, the bale roller 130 has ends 140,142 journaled in bearings 144,146 respectively and which bearings are attached to the inner face surfaces of the roller support frame members 100,102 in the end region outboard of the transverse support member 106 such that the bale roller 130 is parallel to the transverse support member and the bale roller 128 with the longitudinal axis of the bale roller elevated above a surface passing through the transverse support members 104,106. The bale rollers 128,130 are coplanar and lie in a plane parallel to a plane passing through the transverse support members 104,106 and parallel thereto and slightly elevated above the transverse support members. The ends 132,140 respectively of the bale rollers 128,130 extend through the surface of the roller support member 102 and are directly coupled to drive sprockets 148,150 respectively. A shaft 152 has one end connected to a right angle gear 154 whose teeth mesh and engage with the teeth of the bevel gear 98 to rotate the shaft 152 as the table 48 rotates. The end 156 of the shaft 152 extends through a mounting bearing 158 and an opening 160 located substantially midway between the outboard ends of the roller support frame member 102. Sprockets 162,164 are coupled to the end 156 of the shaft 152 and drive sprockets 148,150 respectively by means of a roller chain rotationally coupling the sprockets 162,164 to the driven sprockets 148,150.

Endless belts 170,172 slide laterally over the roller support frame member 102 and encircle the bale rollers 128, 130. Likewise, endless belts 174,176 slide laterally over the roller support frame member 100 and encircle the bale rollers 128,130. As it is seen that the endless belts are easily installed and removed from the table without dismantling the table as is required in the prior art. Because the bale rollers 128,130 are in a plane elevated somewhat above the transverse support members, the endless belts can sag somewhat to form a "drooped" surface to better hold the hay bale as it rotates. A flat bar 178 may be coupled to the underside of the transverse support member 104 or 106 with appropriate spacers 180 located between the flat bar 178 and the transverse support member to provide a space therebetween. The lateral distance between the spacers 180 are such that the width of an endless belt can freely pass therethrough. The purpose of the spacers 180 attached between the flat bar 178 and the transverse support member is to prevent the endless belt from riding laterally off the bale rollers when in operation.

Figure 1:
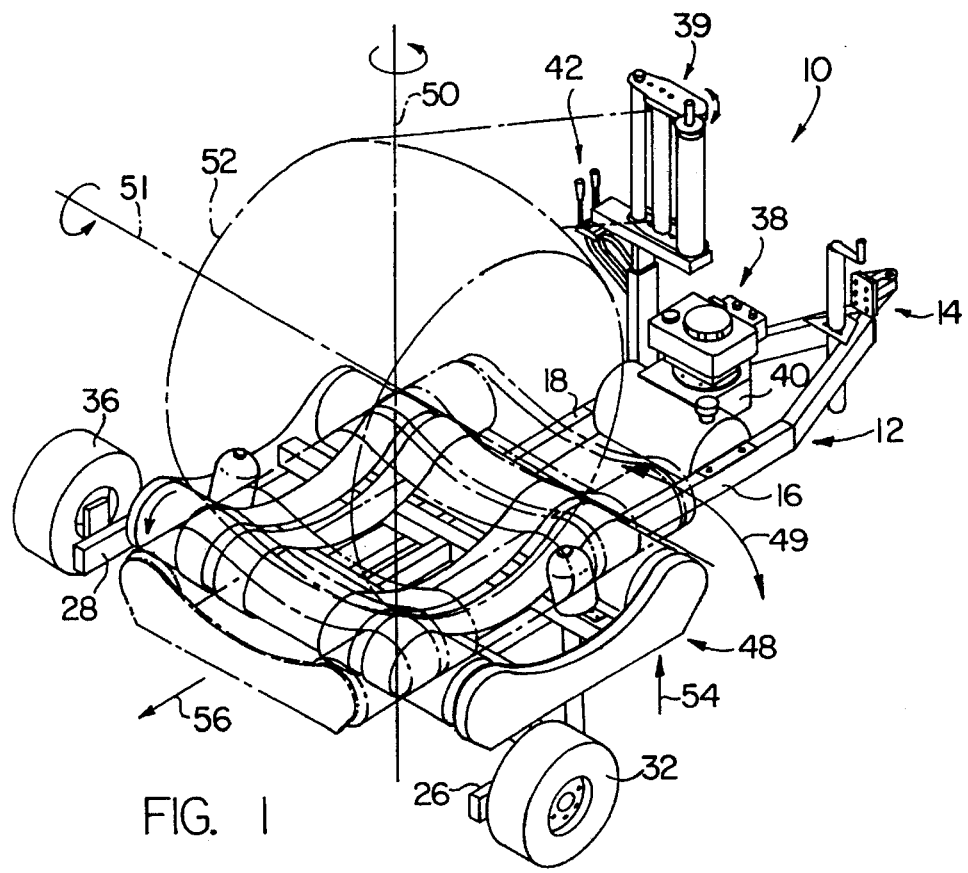
FIG. 1 is a perspective somewhat schematic view of the hay bale wrapper apparatus embodying the present invention, showing the table as it rotates about its central vertical axis.
Figure 2:
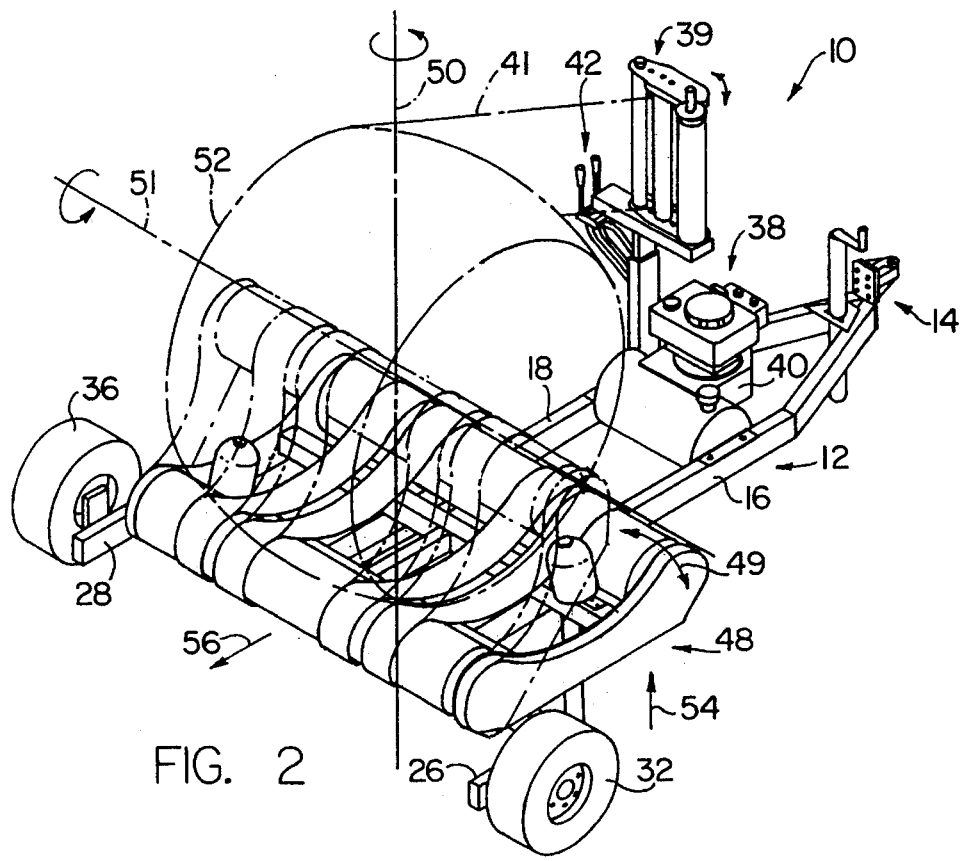
FIG. 2 illustrates the hay bale wrapper apparatus of FIG. 1 showing the table in phantom tilted in its discharge position to dump a wrapped hay bale.

It is also desirable to use bale guide rollers 182,184 which are disposed diagonally opposite one another at the corners of the table and are attach to the transverse support members 104,106 respectively in the region of the roller support frame members as illustrated in FIG. 1. The bale guide rollers 182,184 are inclined slightly inward toward the center of the table and act to retain a rotating bale on the surface of the endless belts and on the table 48. In addition, the bale guide rollers 182,184 will tend to engage the hay bale to rotate it as the table rotates. In some instances, the hay bale tends to be pulled from the surface of the table due to the film wrap tugging in the opposite direction from the direction of table rotation. The bale guide rollers 182,184 act to hold and assist the rotation of the hay bale.

In operation, the table 48 is caused to rotate to wrap the hay bale as it pulls the plastic film from the dispenser explained below and is stopped such that the bale rollers 128,130 are substantially parallel with the transverse support member 20 such that when the hydraulic cylinder 46 is activated, the ram 84 extends to tilt the table upwardly and rearwardly to discharge or dump the wrapped hay bale. One problem generally encountered is that the weight of the table in the tilted position tends to rotate the table and create excessive forces on the hydraulic motor shaft since the hydraulic oil is generally not compressible. The end result is that the shaft of the motor is snapped or broken. In order to avoid this problem, a cross port relief drive valve 190 is used in the hydraulic circuit. The relief valve pressure can be adjusted to provide fluid recirculation to the hydraulic motor to allow the table to rotate without snapping or breaking the motor shaft. Because the apparatus has a low profile, that is, the table 48 is relatively close to the ground, if any rotation does occur, the corner of the table will contact the ground and further rotation will be stopped. Cross port relief drive valves are generally well known to those skilled in the art.

FIG. 4 illustrates a cross-sectional view showing the thrust bearing taken along the lines 4,4 of FIG. 3. The table 48 is connected to the inner bearing race 116 for rotation relative to the outer bearing race 118 which is attached to the center plate 62 of the hydraulic motor pivot bracket 60. The inner bearing race 116 is screwed or attached to the center support plate 112 connecting the transverse support members 104,106. The table 48 is therefore supported by the thrust bearing 114 for rotation relative to the chassis. It should be noted that there is an offset between the inner bearing race 116 and the outer bearing race 118 to provide clearance between the plate 112 and the outer bearing race 118 and further to provide clearance between the support plate 62 and the inner bearing race 116 The thrust bearing 114 is designed such that the inner bearing race 116 is machined with a radial groove 202 on the peripheral outer circumferential surface with a radius accommodating the diameter of the bearing size utilized. The outer bearing race 118 is machined with a radial groove 204 along its inner circumferential surface such that when the outer race and inner race are assembled, a diameter accommodating the diameter of the bearing used is provided. A plug 206 has threads at one end and is screwed into a radially extending threaded opening 208 in the outer bearing race 118 such that the plug 206 is in place prior to the machining of the radial groove 204 and is in turn machined with the inner circumferential surface of the outer bearing race 118. After machining, the plug 206 is removed and the bearing 114 is assembled with the ball bearings being inserted through the threaded opening 208 to enter the groove formed between the inner and outer bearing races. Once the balls are in place, the plug 206 is threaded into the opening 208 in the outer bearing race 118 and is tacked welded to insure that the groove machined in the end of the plug 206 remains in alignment with the groove in the inner circumferential surface of the outer bearing race 118. This novel approach allows the plug 206 to be removed to provide a removal point for the ball bearings so that the thrust bearing 114 can be disassembled for maintenance and/or replacement of the ball bearings in addition to its function for allowing assembly.

Turning now to FIGS. 5 and 6, the pivotal plastic film wrap dispenser and pre-stretch assembly is illustrated in FIG. 5 somewhat schematically in a perspective view with the pre-stretch assembly generally designated 210 pivotally rotated away from the plastic film roll 212 to better show the assembly. The prestretch assembly 210 includes a lower arm assembly 214, and upper arm assembly 216 and a connecting tube 218 at the pivot end 220 of the assembly 210. The tube 218 is welded to the upper and lower arm assemblies to maintain the arms in a parallel spaced relationship and in registration with one another. The assembly 210 further includes an upstream roller 222 extending between the upper and lower arm assemblies 216,214 and is arranged for rotation about its longitudinal axis. A downstream roller 224 has a diameter larger than the diameter of the upstream roller 222 and is arranged for rotation about its longitudinal axis and extends between the upper and lower arm assemblies 216,214 and is parallel to and in a spaced relationship with the upstream roller 222. The upper arm assembly 216 is partially cutaway to show the upper ends of the rollers 222,224 respectively. A sprocket 226 is attached to the roller 222 and is rotationally coupled to a like diameter sprocket 228 attached to the top of the roller 224 by means of a chain 230.

The roller 222 turns at the same rotational speed as the roller 224 by virtue of the two sprockets 226,228 being of equal diameter. The pre-stretch assembly 210 is pivotally held on the dispenser frame generally designated 232 by means of the tube 218 sliding over an upwardly extending rod 234 which is fixedly attached to the frame 232. The film wrap roll is held parallel to the pre-stretch assembly 210 by means of an upwardly extending rod 236 which passes longitudinally through the film wrap roller 212. In operation, a rotating bale tugs on the film shown in phantom as 41 in a direction indicated by the direction arrow 238 which forces the pre-stretch assembly 210 to pivot along the direction arrow 240 toward the film wrap roll 212 so that the film 41 is pinched between the roller 222 and the roller 212. As the film is pulled in the direction of arrow 238, the film causes the roller 222 and 224 to rotate and because of the rotational coupling via the chain 230 to the two respective sprockets 226,228 of equal diameter, the rollers 222 and 224 rotate at the same speed. The diameter of the roller 224 being larger than the diameter of the roller 222 tends to roll more film during a rotation than the roller 222 thereby imparting a stretch to the material prior to its being wrapped on the hay bale.

The amount of pre-stretch applied to the plastic film material is variable by moving the roller 224 toward or away from the roller 222. A number of attachment holes 242,244 in the upper and lower arm assemblies 216,214 respectively allow the roller 224 to be moved as desired to vary the stretch with less stretch being imparted as the rollers are moved further apart.

The rollers are connected to the respective upper and lower arm assemblies by means of screws passing through the arms and through flanges 248 at either end of the axial bore of the roller 222. A rod 250 extends between the upper and lower arm assemblies and receives the respective screws 252,254 passing through the upper and lower arm assemblies respectively permitting the roller to rotate. The downstream roller 224 is similarly constructed with flanges 256 at either end of an axial bore passing through the roller. A rod 258 passes through the axial bore of the roller 224 and is connected between the upper and lower arm assemblies 216,214 by means of screws 260 which are threaded into the ends of the rod 258 thereby permitting the roller 224 to rotate.

Apparatus for wrapping bales of hay has been disclosed above in preferred embodiments. Numerous changes and modifications may be made by those skilled in the art without departing from the spirit and scope of the invention and therefore the invention has been described by way of illustration rather than limitation.

I claim:

1. In a silage bale wrapping apparatus for attachment to a of a propelling vehicle and having a generally rectangular bale table, a chassis, table supporting means for mounting the bale table on the chassis to rotate about a vertical axis and tilt about a horizontal axis relative to the chassis, first and second bale rollers supported by the bale table for rotation about parallel horizontally disposed axes, at least two endless belts carried by the bale rollers for supporting a bale of silage on the bale table, and dispensing means for delivering stretchable plastic film to the bale table to wrap a bale supported on the table, the improvement wherein said table has a frame including longitudinally extending first and second roller support side frame members each of said side frame members having opposite first and second free ends, transverse support members connected to and extending between said first and second side frame members inboard of said free ends and maintaining said first and second side frame members in parallel transversely spaced apart relation to each other, said table supporting means being connected to said traverse support members of said frame and providing the sole support for said bale table, said first and second free ends extending outwardly in opposite directions and in cantilever positions beyond said transverse support members, said first and second bale rollers being solely supported on said frame by said free ends, at least one of said belts being supported on said bale rollers between said table supporting means and one of said side frame members, said one of said belts being freely removable from said frame and in the direction of said one of said side members without disassembly of said bale table.

2. In a silage bale wrapping apparatus as set forth in claim 1 the further improvement wherein at least another of said belts is supported on said bale rollers between said table supporting means and the other of said side frame members, and is freely removable from said frame and in the direction of said other of said side members without disassembly of said bale table.

3. In a silage bale wrapping apparatus as set forth in claim 2 the further improvement wherein said belts are loosely supported on said bale rollers and maintained in frictional engagement with said bale rollers by the weight of a bale supported by said belts.

4. In a silage bale wrapping apparatus as set forth in claim 1 the further improvement wherein said table supporting means includes a bearing assembly having coaxially disposed inner and outer bearing races, said inner race defining a coaxial radially outwardly open annular inner groove in the outer peripheral surface thereof, said outer race defining a coaxial radially inwardly open outer groove in the inner peripheral surface thereof, said inner and outer grooves cooperating to define a raceway containing a plurality of ball bearings, said outer race having an opening therein communicating with said raceway for insertion of ball bearings into and removal of ball bearings from said race way, and a plug received within and providing a closure for said opening, said plug having an inner end defining a portion of said outer groove.

5. In a silage bale wrapping apparatus as set forth in claim 4 the further improvement wherein one of said races comprising said inner and outer race is connected to said chassis and the other of said races comprising said inner and outer race is connected to said bale table.

6. In a silage bale wrapping apparatus as set forth in claim 1 the further improvement comprising a pair of bale guide rollers supported for rotation on and relative to said table inboard of said bale rollers and at generally diagonally opposite sides of the bale table for retaining a rotating bale on said bale table.

7. In a silage bale wrapping apparatus as set forth in claim 6 the further improvement wherein said bale guide rollers are supported for rotation about upwardly extending axes inclined inwardly toward the center of said bale table.

8. In a silage bale wrapping apparatus as set forth in claim 1 wherein said apparatus includes belt guide means for preventing each endless belt from riding laterally off of the bale rollers when the apparatus is operated.

9. In a silage bale wrapping apparatus as set forth in claim 8 the further improvement wherein said belt guide means is coupled to an underside of said frame.

10. In a silage bale wrapping apparatus as set forth in claim 1 the further improvement wherein said dispensing means comprising a plurality of generally cylindrical dispensing rollers journalled for rotation about parallel axes and including an upstream roller and a downstream roller, means for coupling said dispensing rollers to rotate at the same rotational speed, said downstream dispensing roller having a diameter substantially larger than the diameter of said upstream dispensing roller.

* * * * *